Patented June 6, 1950

2,510,864

UNITED STATES PATENT OFFICE 2,510,864

CATALYSTS FOR FLUORINATION

George H. Cady, Leonia, N. J., assignor to the United States of America as represented by the United States Atomic Energy Commission No Drawing. Application January 22, 1943, Serial No. 473,248

14 Claims. (Cl. 252—441)

This invention relates to the preparation of a catalyst used in the preparation of fluorinated hydrocarbon compounds.

When fluorine reacts with a hydrocarbon, a great deal of heat is produced within the vessel. The heat of the reaction tends to establish large temperature differences between different parts of the catalyst mass which slows up the reaction. Near the center of the vessel, for example, the temperature may become a number of degrees higher than at the walls. These temperature differences result in lower yields of the fluorinated products than can be obtained if the temperature is uniform and maintained constant throughout the entire catalyst bed. It is the principal purpose of the present invention to produce a good catalyst material whose high thermal conductivity reduces the harmful temperature differences.

The catalyst may comprise a thin layer of active catalyst material held upon a metal base of any suitable form such as wire, gauze sheet, sponge, granules, etc. The preferred base is copper because of its rapid thermal conductivity, but other metals having high heat conductivity and relatively inert to fluorine may be used, such as nickel or iron. The preferred catalysts are the fluorides of silver, cerium, manganese, or cobalt.

One method of application of the catalyst is to plate the silver, cobalt, manganese, or cerium upon the rapid thermal conducting base, preferably copper, and subsequently convert the plated metal to its fluoride by direct fluorination.

One example of the process in accordance with the invention is as follows:

Copper turnings are plated with metallic silver by mixing the turnings in an aqueous solution made by adding sodium cyanide to a solution of silver nitrate, until no precipitate of silver cyanide remains. The plating may be done by electroplating, spraying, or electrochemical replacement, that is, any method of plating may be employed. After plating the turnings are thoroughly washed and dried.

When the plating is completed, the plated turnings are placed in an electrically heated copper reaction vessel equipped with an internal thermocouple well. The copper reaction vessel may be silver plated, which under certain conditions assists the fluorination. The catalyst is then activated by heating the vessel to approximately 200° C. and passing a stream of elemental fluorine gas mixed with nitrogen gas into the vessel, until the halogen passes through the vessel without reacting. The catalyst at this stage gives the appearance of metallic copper, the silver having been converted to silver fluoride.

The use of these high heat conducting metal fluoride catalysts has greatly increased the yield of the fluorocarbons, such as perfluoroheptane ($C_7F_{16}$), perfluorodimethylcyclohexane ($C_8F_{16}$), et al., described in my copending application, Serial No. 478,567, filed March 9, 1943.

The present invention is not to be limited to any particular apparatus or to particular reactions taking place in the vessel nor to the methods of plating mentioned nor to any specific metal discussed, but only by the following claims:

I claim:

1. A process for the production of a catalyst for the fluorination of organic compounds which comprises plating a heat conducting metal substantially resistant to attack by fluorine with a metal which reacts readily with fluorine selected from the group consisting of silver, cobalt, manganese and cerium and reacting the latter with a fluorinating agent.

2. A process for the preparation of a fluoride catalyst comprising the plating of a heat conducting metal substantially resistant to attack by fluorine with a metal which reacts readily with fluorine selected from the group consisting of silver, cobalt, manganese and cerium, and subjecting the same at an elevated temperature to a stream of a mixture of fluorine and a diluent substantially unreactive with said metals.

3. A process for the production of a fluoride catalyst which comprises plating silver on a heat-conducting metal substantially resistant to attack by fluorine and reacting the silver with a fluorinating agent.

4. A process for the production of a fluoride catalyst which comprises plating manganese on a heat-conducting metal substantially resistant to attack by fluorine and reacting the manganese with a fluorinating agent.

5. A process for the production of a fluoride catalyst which comprises plating cobalt on a heat-conducting metal substantially resistant to attack by fluorine and reacting the cobalt with a fluorinating agent.

6. A process for the production of a fluoride catalyst which comprises plating cerium on a heat-conducting metal substantially resistant to attack by fluorine and reacting the cerium with a fluorinating agent.

7. A process for the production of a catalyst for the fluorination of organic compounds which comprises plating copper with a metal which readily reacts with fluorine selected from the group consisting of silver, cobalt, manganese and cerium, and reacting the latter with a fluorinating agent.

8. A process for the preparation of a fluoride catalyst comprising the plating of a heat conducting metal substantially resistant to attack by fluorine with a metal which readily reacts with fluorine selected from the group consisting of silver, cobalt, manganese and cerium, and subjecting the same to a stream of a mixture of fluorine and a diluent substantially unreactive with said metals with the temperature maintained at approximately 200° C. during fluorination.

9. A process for the preparation of a fluoride catalyst comprising subjecting a metal which readily reacts with fluorine selected from the group consisting of silver, cobalt, manganese and cerium, plated upon a heat conducting metal substantially resistant to attack by fluorine, to a stream of a gaseous mixture of fluorine and a diluent substantially unreactive with said metals.

10. A process for the preparation of a fluoride catalyst comprising subjecting a metal which readily reacts with fluorine selected from the group consisting of silver, cobalt, manganese and cerium plated upon a heat conducting metal substantially resistant to attack by fluorine, to a stream of a gaseous mixture of fluorine and nitrogen.

11. A process for the preparation of a silver fluoride catalyst which comprises plating silver upon copper and reacting the silver with a fluorinating agent.

12. A process for the preparation of a manganese fluoride catalyst which comprises plating manganese upon copper and reacting the manganese with a fluorinating agent.

13. A process for the preparation of a cobalt fluoride catalyst which comprises plating cobalt upon copper and reacting the cobalt with a fluorinating agent.

14. A process for the preparation of a cerium fluoride catalyst which comprises plating cerium upon copper and reacting the cerium with a fluorinating agent.

GEORGE H. CADY.

REFERENCES CITED

The following references are of record in the file of this patent:

UNITED STATES PATENTS

| Number | Name | Date |
|---|---|---|
| 643,835 | Valentiner | Feb. 20, 1900 |
| 1,043,580 | Eldred | Nov. 5, 1912 |
| 1,477,058 | Houlehan | Dec. 11, 1923 |
| 1,707,331 | Storch | Apr. 2, 1929 |
| 1,758,293 | Murray | May 13, 1930 |
| 2,085,535 | Langedijk et al. | June 29, 1937 |
| 2,194,186 | Pier et al. | Mar. 19, 1940 |
| 2,330,539 | Anchter | Sept. 28, 1943 |

OTHER REFERENCES

Adams et al., "Organic Reactions," vol. 2, page 56.
John Wiley and Sons, Inc. (New York), 1944.